United States Patent [19]

Schussler

[11] Patent Number: 5,325,753
[45] Date of Patent: Jul. 5, 1994

[54] CUTTING BLADE HOLDER ASSEMBLY

[75] Inventor: Horst Schussler, Rossdorf, Fed. Rep. of Germany

[73] Assignee: Maschinenfabrik Goebel GmbH, Darmstadt, Fed. Rep. of Germany

[21] Appl. No.: 865,271

[22] Filed: Apr. 8, 1992

Related U.S. Application Data

[63] Continuation of PCT/DE91/00826, Oct. 23, 1991, abandoned.

[30] Foreign Application Priority Data

Oct. 27, 1990 [DE] Fed. Rep. of Germany ..... 40342522

[51] Int. Cl.$^5$ ............................................. B23D 19/00
[52] U.S. Cl. ........................................ 83/481; 83/676; 83/698.11
[58] Field of Search .................. 83/481, 486, 500, 663, 83/676, 698, 485

[56] References Cited

U.S. PATENT DOCUMENTS

| | | | |
|---|---|---|---|
| 1,723,660 | 10/1929 | Ross | 83/500 |
| 3,440,915 | 4/1969 | Weyant | 83/481 |
| 3,905,264 | 9/1975 | Eddy | 83/481 |
| 5,061,129 | 10/1991 | Baudermann | 83/676 |

FOREIGN PATENT DOCUMENTS 1054380 1/1967 United Kingdom ................. 83/676

Primary Examiner—Eugenia Jones
Assistant Examiner—Allan M. Schrock
Attorney, Agent, or Firm—Watson, Cole, Grindle & Watson

[57] ABSTRACT

A cutting blade holder assembly has a first subassembly attachable to a machine frame and a second assembly coupled to the first subassembly and removable therefrom. A cutting tool having a circular outer contour is mounted on the second subassembly, and only one of the opposing sides of the cutting tool is supported via the first assembly such that the assembly is of narrower overall width permitting narrower strips to be slit from a web. A force applying mechanism acts between the first and second subassemblies for maintaining the subassemblies in a side-by-side relationship.

2 Claims, 1 Drawing Sheet

CUTTING BLADE HOLDER ASSEMBLY

This is a continuation of International Application No. PCT/DE91/00826, filed Oct. 23, 1991, which designated the United States and is now abandoned.

BACKGROUND OF THE INVENTION

This invention relates generally to a cutting blade holder assembly which includes a first subassembly attachable to a machine frame, and a second subassembly coupled to the first subassembly and being removable therefrom, a cutting tool having a substantially circular outer contour being mounted on the second subassembly.

A pair or pairs of cooperating blades are used to process substrates, for example, relatively wide webs of paper, film, fabric, metal, plastic or the like, by slitting or perforating the webs in the longitudinal direction to form narrow strips. After such operation, the resulting slitted strips travel together to another processing machine, such as a winding machine at which the cut strips are wound into rolls. The cutting tool usually comprises one or more cutting pairs including an upper circular cutting blade and a lower circular interacting knife blade designed as a counter-tool.

The substrate to be machined, for example, a web of paper, may bear against a lower rotatable cylinder for effecting the longitudinal slits. During the machining operation the cutting tools must interact with one another so that a desired machining quality can be obtained. Thus, if during a scissor cut effected with rotary upper and lower knives, the interacting edges to not interact well with one another during the cutting operation, unclean cut edges of the paper web will result which can lead to problems during the subsequent winding operation of the cut strips. Similar undesired consequences can occur if the web of paper, film, fabric, plastic, metal or the like is not cleanly perforated during the machining operation.

The cutting tool or tools are mounted in a holder or holders side-by-side on a guide or the like so that several strips lying side-by-side can be cut simultaneously from an endless web.

In order to maintain the cutting tools aligned during the machining operation, they are supported by such holders mounted on the processing machine. Such a holder is disclosed in European Patent No. 0 333 001 which includes a first holding device which can be inserted into and attached to the machine frame. A second holding device is coupled to the first device and is removable therefrom, the cutting tool in the shape of a circular knife blade or perforated knife or the like being attached to the second holding device. In such manner the cutting tool can be removed, when necessary, and replaced by another tool. The first and second holding devices of the prior art holder are, however, designed in such manner that the knife blade is rotatably supported on opposite sides. Thus, the cutting tool holder must be relatively long in the direction of the axis of rotation of the cutting tool. And, the distance between individual knives arranged side-by-side in the machine can be arranged only as short as the overall design of the holder permits. Since this known holder is of such relatively wide dimension in the axial direction of the knife blade, only relatively wide strips can be cut from a substrate.

SUMMARY OF THE INVENTION

It is therefore an object of the present invention to provide a cutting blade holder assembly which is more compact and of a considerably shorter width in the axial direction of the cutting tool such that narrower strips are capable of being cut from the web.

The cutting blade assembly of the invention includes a first subassembly attachable to a machine frame, and a second subassembly coupled to the first subassembly and being removable therefrom. The cutting tool has a substantially circular outer contour mounted on the second subassembly, and only one of the opposing sides of the cutting tool is supported via the first subassembly. At least one stop element in the first subassembly acts in an axial direction of the tool and bears against the second subassembly for aligning the second subassembly relative to the first subassembly. The subassemblies are resiliently coupled together, and can be quickly disconnected for uncoupling the subassemblies.

Other features, objects, and advantages of the present invention will become more apparent from the following detailed description of the invention when taken in conjunction with the accompanying drawings.

The several drawings are essentially schematic and illustrate only those features essential to the invention while other features known to one skilled in the art are omitted for the sake of clarity.

Figure 1:
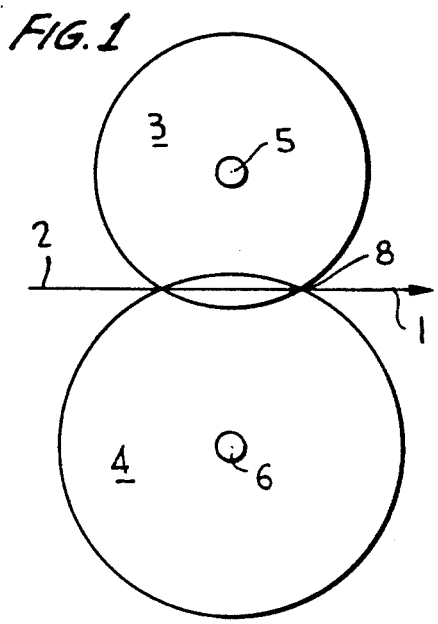
FIG. 1 is an end view schematically illustrating a pair of cooperating circular cutting blades for longitudinally slitting a web, the holder assembly of the invention being omitted for clarity.

In FIG. 1, an endless web 2 is shown passing through the cutting blade pair for being divided into strips 1, the web being of paper, film, fabric, plastic, metal or the like, and the cutting blade pair comprising at least one pair of upper and lower circular cutting knives 3 and 4. However, several such knife pairs can be arranged in succession one behind the other when viewed in FIG. 1.

Upper knife blade 3 is rotatably supported by a shaft 5, and lower blade 4 is rotatably supported by shaft 6. The shaft 5 and 6 can extend over the entire width of web 2 to be cut into strips 1 and are rotatably mounted in a machine frame.

Figure 2:
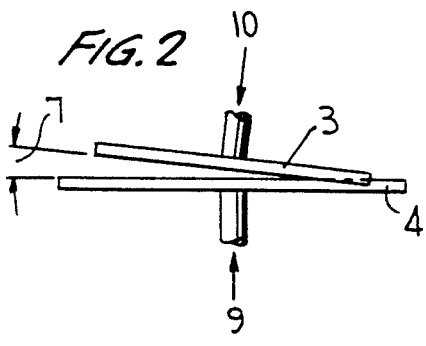
FIG. 2 is a top view of the cutting blade pair of FIG. 1.

The upper knife blade, for example, rotates in a separate blade holder mounted on the machine frame. The upper knife blade or blades and the lower knife blade or blades are sloped relative to one another so that as seen in FIG. 2 an angle 7 is formed between each upper and lower knife blade forming a cutting point 8 at which the blades make contact with one another. Cutting point 8 is not actually a point in the mathematical sense since the cutting blades 3 and 4 are flattened off slightly by the forces acting thereon. The forces act on the lower knife blade, for example, in the direction of arrow 9, whereas the forces act on the upper knife blade 3 and in the direction of arrow 10 so that they press against one another at cutting point 8. In such manner, a scissor-like cut is produced that results in a small cutting area due to the forces and the elasticity of the knives. Analogous conditions are produced during other types of processing, such as that of perforating.

Figure 3:
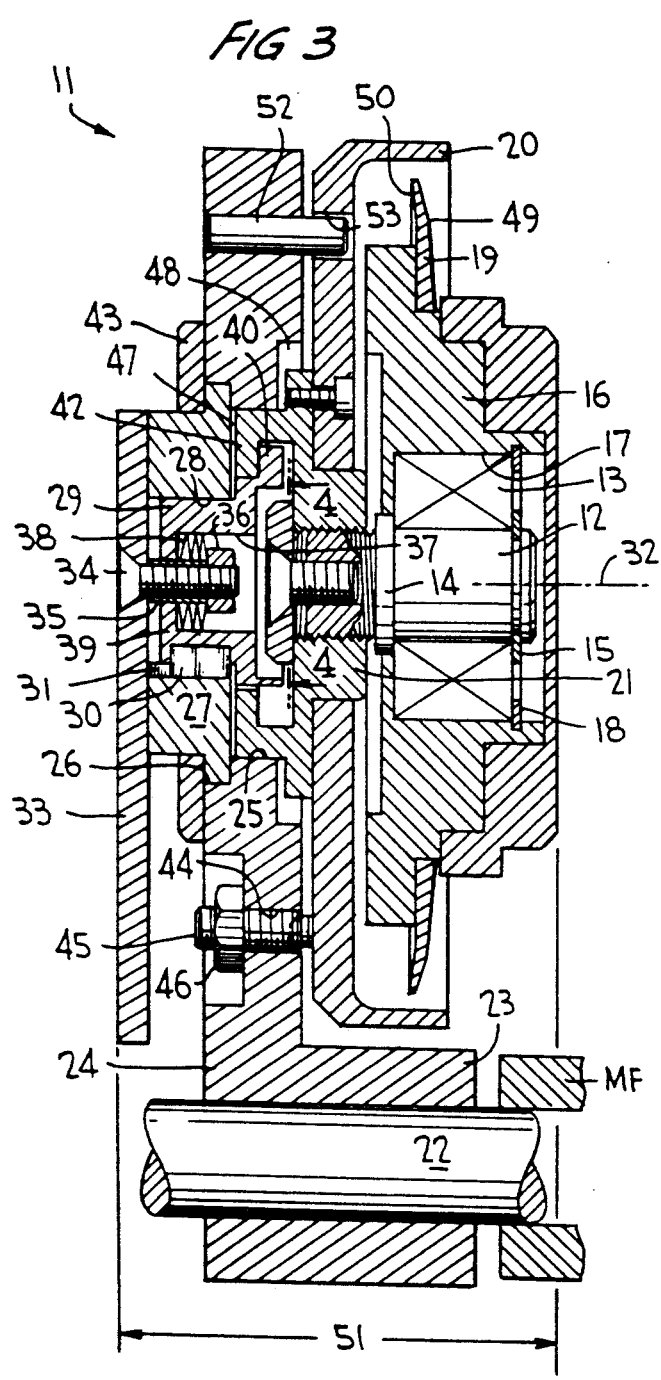
FIG. 3 is a vertical sectional view of the cutting blade holder assembly of the invention.

A cutting blade holder assembly of the invention is generally designated 11 in FIG. 3 for the upper knife blade having a non-rotatable shaft 12 which is analogous to shaft 5. Assembly 11 can likewise be provided for lower knife blade 6.

A bearing 13 such as a roller bearing surrounds shaft 12 and is attached thereto by, for example, a chamfer element 14 and a retaining ring 15. A hub 16 is supported on the bearing such that a recess 17 of the hub accommodates the bearing. A circular cutting tool 19 in the form of a cutting blade is attached in some normal manner to hub 16. A side wall element 20 is attached in such manner on shaft 12 that it is incapable of rotation relative thereto. A coupler 21, hereinafter referred to as a second coupler, is connected to side wall 20, and the parts 12 to 18, 20, 21 represent a second subassembly supporting cutting tool 19.

A first subassembly of the cutting blade holder assembly, which first subassembly is moveable along guide 22 extending perpendicular to web 2 and mounted on machine frame MF, comprises a carriage 23 or the like moveable along guide 22 and fixed in position at some desired location relative to the guide. The first subassembly includes an arm 24 integral with or attached to carriage 23. Arm 24 has a bore 25 into which second coupler 21 extends. Arm 24 also has a stepped bore 26 into which a centering member 27 having a circular outer contour extends. Centering member 27 has a bore 28 into which a first coupler 29 extends. First coupler 29 has a key 30 projecting in the direction of central axis 32 of shaft 12, the key extending into a groove 31 provided in centering member 27. In such manner first coupler 29 is rotatable together with centering member 27 but can be shifted relative to member 27 in the direction of axis 32 which likewise forms the central axis of cutting tool 19.

A manually operated rocking lever 33 is attached to centering member 27 for movement thereof about axis 32. A screw 34 which supports a sleeve 35 extends through lever 33 and into first coupler 29. A nut 36 on screw 34 bears against sleeve 35. First coupler 29 has a central bore 37 into which elements 34, 35 and 36 extend. Bore 37 likewise contains one or more cup springs 38 located between sleeve 35 and first coupler 29 as well as between nut 36 and wall 39 of first coupler 29.

Figure 4:
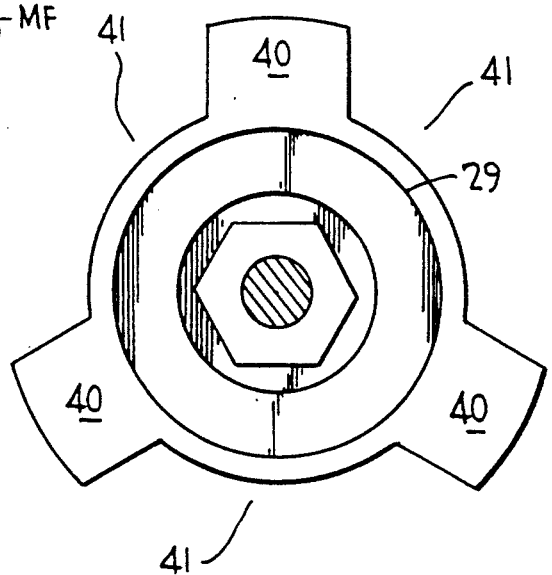
FIG. 4 is a detail view in plan and at an enlarged scale taken in the direction of line 4—4 of FIG. 3.

As more clearly shown in FIG. 4, first coupler 29 has a plurality of circumferentially spaced and radially extending claws 40 with gaps 41 formed therebetween. Thus, elements 27 to 31 and 33 to 41 comprise the first subassembly.

The first and second subassemblies together form cutting blade holder assembly 11 for cutting tool 19.

Second coupler 21 has claws 42 similar to that of claws 40, claws 42 being circumferentially spaced and extending radially with gaps formed therebetween. The claws of both couplers are smaller in width compared to the gaps located between the claws. In such manner, claws 42 extend through gaps 41 of the first coupler when centering member 27 is suitably rotated by manually operating rocking lever 33. A retaining ring 43 is attached to the first subassembly for retaining member 27 on arm 24. Arm 24 has a threaded bore 44, a screw 45 threadedly engaging bore 44 and being locked in place by a nut 46. Screw 45 bears against side wall 20 so as to provide a limit stop for the spacing between the second subassembly and the first subassembly. Several such screws 45 can be distributed uniformly or non-uniformly over the circumference of the cutting tool for aligning and adjusting the second subassembly relative to the first subassembly.

A first annular space 47 is formed between second coupler 21 and centering member 27. And, a second annular space 48 is formed between second coupler 21 and arm 24. These spaces allow springs 38 to exert forces in the direction of axis 32 to effect contact between the first and second subassemblies.

Starting from first coupler 29 and its claws 40, these forces are transferred from springs 38 to claws 42 of second coupler 21 and thus to shaft 12 and the elements attached thereto. And, spaces 47 and 48 are dimensioned in such manner that an operator can grasp side wall 20 without the aid of a tool, press against the second subassembly and turn lever 33 about axis 32 such that claws 40 and 42 of the couplers disengage. The same applies in the reverse direction during the mounting of a new second subassembly with a suitable newly prepared cutting tool. Since only one of the opposing sides 4 and 50 of cutting tool 19 is supported by the first subassembly, i.e., essentially by arm 24 and everything attached to it, a unilateral or so-called fly mount is provide for cutting tool 19 and therefore also for the second subassembly. Such a design leads to the entire cutting blade holder assembly 11 extending in the direction of axis 32 as having a width 51. By providing only one arm 24 by means of the fly mount, this dimension 51 can be maintained relatively short which is shorter than the corresponding dimension of the prior art device. In such manner the cutting tools can be located correspondingly closer together for cutting the web into correspondingly narrower strips. The same applies to perforating and other tools when other types of processing are to be carried out.

Generally, the screw or screws 45 need be set only once during assembly of the bottom support device of the machine. In such manner several second subassemblies can be mounted optionally to the same first subassembly. The result is a suitably selected mode of attachment and for each subassembly the same position with respect to the first subassembly and also with respect to the machine.

If the cutting tool is set in a simulator or the like outside the machine, and while the machine continues to operate with an identical or similar additional second subassembly including a related additional cutting tool, and is set and attached in the second subassembly in such manner that the machining edge of the cutting edge occupies a defined position relative to side wall 20, then, even after replacement of the second subassembly, the cutting edge of the cutting tool moves in the same position which another cutting tool had occupied in another second subassembly during the earlier production operation. Of course, the cutting tool must be designed to match hub 16 but may require adjustment when during regrinding the cutting edge has a slightly different position relative to the knife blade compared to that which it had occupied before the regrinding or resharpening operation.

Various modifications and variations of the present invention are made possible in the light of the above teachings. For example, cup springs 38 can be eliminated if the remaining components, particularly the couplers, are made flexible. In addition, the couplers can be made so as to have point symmetry.

And, at least one peg 52 extending into a bore 53 of wall 20 can be attached to arm 24 so that the second subassembly is prevented from rotating together with cutting tool 19. And, any guide other than guide 22 described can be provided for efficiently guiding the cutting tool. Furthermore, parts 12, 21 and 20 can be interconnected together as a single unit.

From the foregoing it can be seen that the cutting blade holder assembly according to the invention is of narrower overall width compared to prior art devices so that when several holder assemblies are arranged side-by-side in the machine they can be moved closer together. The web can therefore be cut into narrower strips for rewinding into rolls.

Moreover, the cutting tool can be rapidly and simply removed from the machine and from the first subassembly and can be replaced by another cutting tool, without the need of any auxiliary tool. The claws of the first and second couplers interengage for coupling the first and second subassemblies together, and disengage upon pivotable movement of arm 33 by the operator.

The cutting tool can be readily reconditioned during another processing operation after removal such that the machine can continue to operate with the other cutting blade. For example, reconditioning comprises regrinding and subsequently adjusting when the knife blade becomes dull during a preceding operation. The removed knife blade can thereafter be reused in another operation while the machine continues to run. Since the machine can continue to operate the otherwise time-consuming resetting and grinding operations are avoided. Following completion of the maintenance work, such as grinding and readjusting, the knife blade that has been repaired can be quickly reinserted thereby resulting in a very short downtime of the machine which avoids production losses. The knife blade can be optionally set with appropriately alignment of an upper knife blade relative to the lower knife blade.

What is claimed is:

1. A cutting blade holder assembly comprising, a first subassembly mounted on a machine frame provided by supporting the holder assembly, said first subassembly including a first claw coupled having an axial shaft and a second subassembly spaced a predetermined distance apart from and releasably coupled to said first subassembly, said second subassembly including a second claw coupler having a shaft coaxial with the first claw coupler shaft, a cutting tool hub rotatably mounted on said second claw coupler shaft, and a circular cutting tool mounted on said hub for rotation together therewith, said first claw coupler being rotatably mounted on said first subassembly for interengagement with said second claw coupler for releasably coupling said second subassembly to said first subassembly, said first subassembly including a lever mounted to said first claw coupler for manual rotation thereof into and out of engagement with said second claw coupler, said holder assembly further comprising an adjustable stop means on said first subassembly which bears against said second subassembly for adjusting the distance between said subassemblies, and said first assembly further including resilient means for resiliently coupling said subassemblies together at a spacing permitted by said stop means.

2. The assembly according to claim 1, wherein said resilient means comprises a spring acting between said lever and said first claw coupler.

* * * * *